(12) United States Patent
Sansone

(10) Patent No.: US 6,937,938 B2
(45) Date of Patent: Aug. 30, 2005

(54) METHOD AND APPARATUS FOR INTERFEROMETRY, SPECTRAL ANALYSIS, AND THREE-DIMENSIONAL HOLOGRAPHIC IMAGING OF HYDROCARBON ACCUMULATIONS AND BURIED OBJECTS

(76) Inventor: Stanley A. Sansone, 6206 Sampras Ace Ct., Spring, TX (US) 77379

( * ) Notice: Subject to any disclaimer, the term of this patent is extended or adjusted under 35 U.S.C. 154(b) by 0 days.

(21) Appl. No.: 10/235,149

(22) Filed: Sep. 4, 2002

(65) Prior Publication Data

US 2004/0044479 A1 Mar. 4, 2004

(51) Int. Cl.$^7$ .............................................. G01V 1/28
(52) U.S. Cl. ....................................................... 702/16
(58) Field of Search ............................ 702/14, 16, 17; 367/72, 73

(56) References Cited

U.S. PATENT DOCUMENTS

| | | | |
|---|---|---|---|
| 2,757,356 A | 7/1956 | Haggerty ........................ 340/7 |
| 3,729,704 A | * 4/1973 | Farr ................................ 367/9 |
| 3,852,709 A | * 12/1974 | Mueller .......................... 367/9 |
| 3,942,150 A | 3/1976 | Booth et al. |
| 4,316,267 A | 2/1982 | Ostrander ..................... 367/68 |
| 4,499,565 A | 2/1985 | Fix et al. ....................... 367/49 |
| 4,512,198 A | 4/1985 | Sinha et al. |
| 4,979,150 A | 12/1990 | Barr ............................. 367/24 |
| 5,226,019 A | 7/1993 | Bahorich ...................... 367/74 |
| 5,231,252 A | 7/1993 | Sansone ..................... 181/122 |
| 5,235,554 A | 8/1993 | Barr et al. ..................... 367/13 |
| 5,335,208 A | 8/1994 | Sansone ....................... 367/49 |
| 5,414,674 A | 5/1995 | Lichman ....................... 367/49 |
| 5,545,858 A | 8/1996 | Sansone ..................... 181/122 |
| 5,767,407 A | 6/1998 | Sinha |
| 5,859,811 A | 1/1999 | Miller et al. .................. 367/35 |
| 5,942,688 A | 8/1999 | Kimura et al. |
| 5,943,132 A | 8/1999 | Erskine ....................... 356/349 |
| 6,021,094 A | 2/2000 | Ober et al. .................... 367/53 |
| 6,052,334 A | 4/2000 | Brumley et al. |
| 6,064,630 A | * 5/2000 | Fersht et al. ................ 367/149 |
| 6,065,538 A | 5/2000 | Reimers et al. |
| 6,131,071 A | 10/2000 | Partyka et al. ................ 702/16 |
| 6,160,757 A | 12/2000 | Tager et al. ................. 367/119 |
| 6,161,434 A | 12/2000 | Fink et al. .................... 73/587 |
| 6,288,975 B1 | * 9/2001 | Frederick et al. ........... 367/149 |
| 6,325,172 B1 | * 12/2001 | Langridge et al. .......... 181/122 |
| 6,363,034 B1 | 3/2002 | Varnham ..................... 367/149 |
| 6,389,362 B1 | 5/2002 | Garotta et al. ................ 702/17 |
| 6,488,116 B2 | 12/2002 | Bailey ......................... 181/108 |
| 6,512,980 B1 | 1/2003 | Barr ............................... 702/1 |
| 6,594,585 B1 | * 7/2003 | Gersztenkorn .............. 702/14 |
| 6,597,632 B2 | * 7/2003 | Khan ........................... 367/32 |
| 6,678,617 B2 | * 1/2004 | Khan ........................... 702/16 |
| 6,684,159 B2 | * 1/2004 | Khan et al. .................. 702/16 |
| 6,728,165 B1 | * 4/2004 | Roscigno et al. ............. 367/14 |

* cited by examiner

*Primary Examiner*—Donald McElheny, Jr.

(57) ABSTRACT

A methods and apparatus for the detection and exploration of buried objects and hydrocarbons uses two separate signals having different frequency characteristics combined to enable interferometric analysis and imaging systems including radar, sonar, seismological, and general acoustical systems. The measurement and analysis of absorption and other elastic moduli are derived from a three-dimensional display of interferometric information. Interferometric holography also employs the unique characteristic record of frequency, phase, and amplitude of more than one signal.

53 Claims, 11 Drawing Sheets

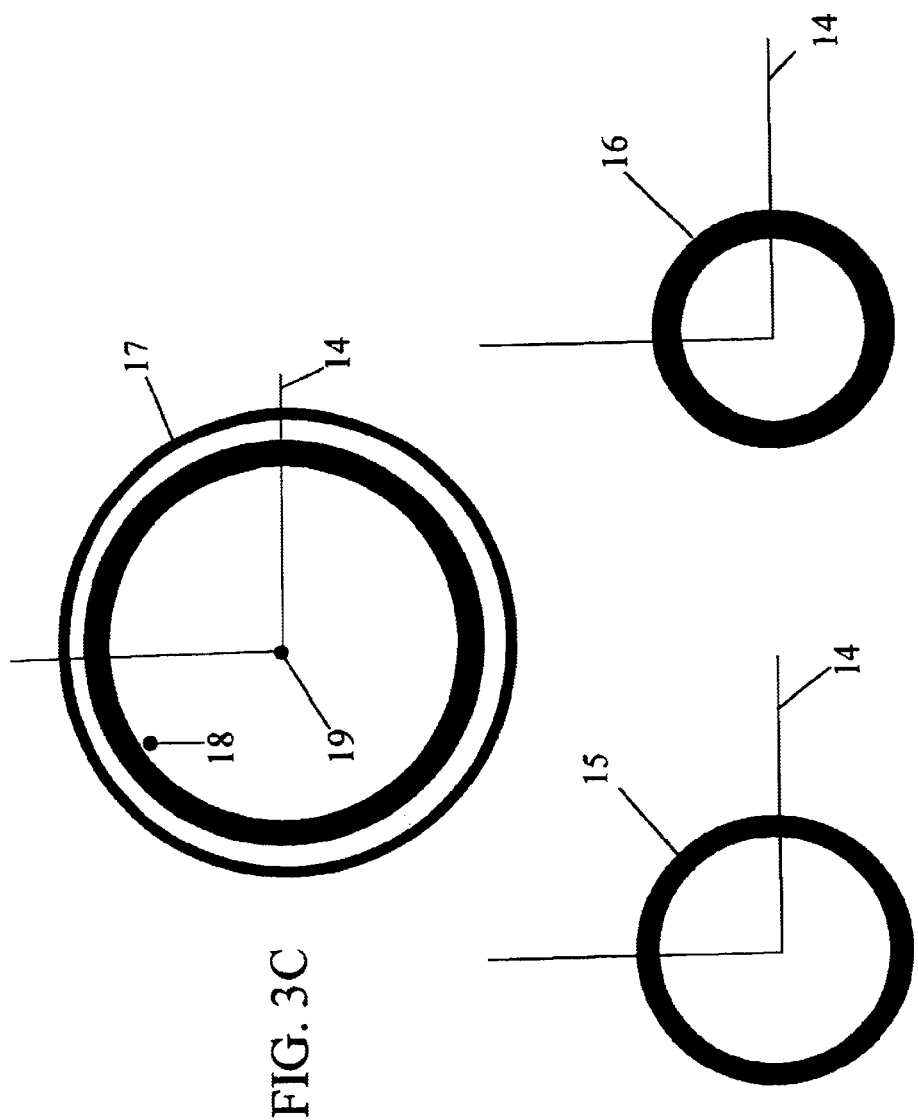

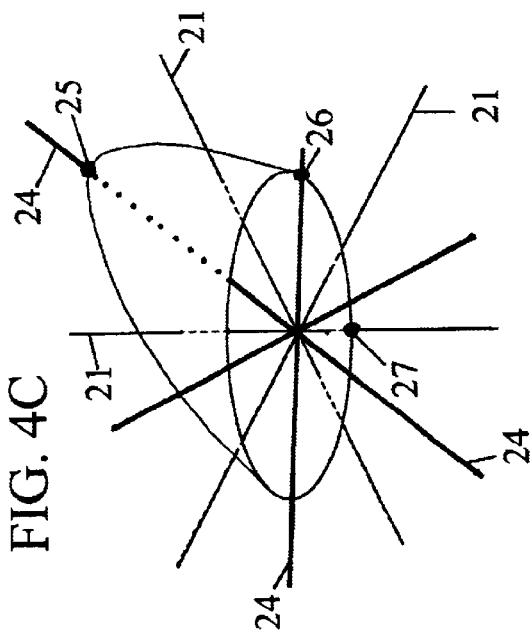
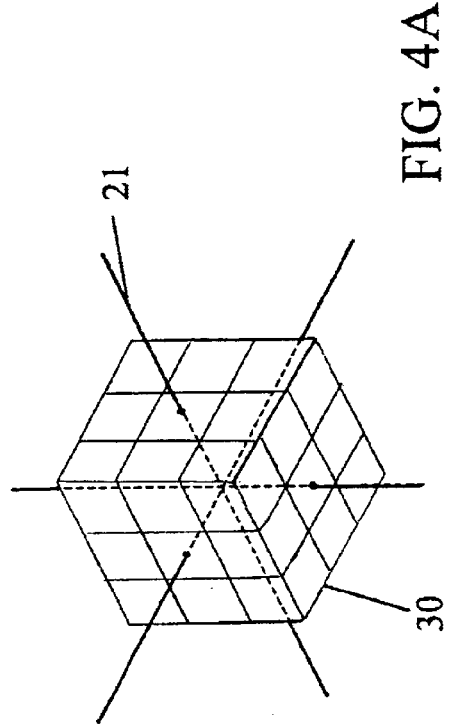
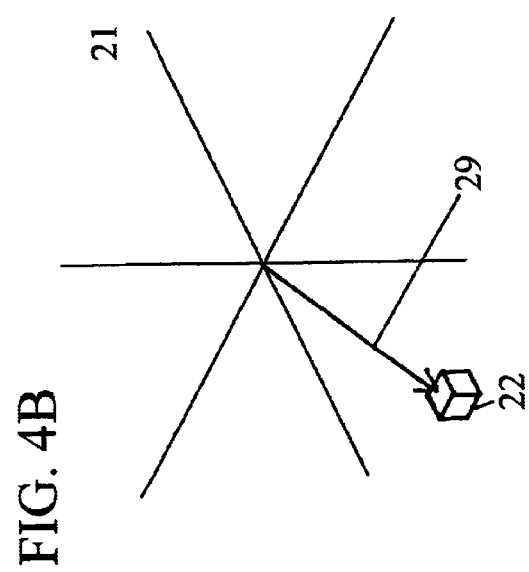
FIG. 4C
FIG. 4A
FIG. 4B

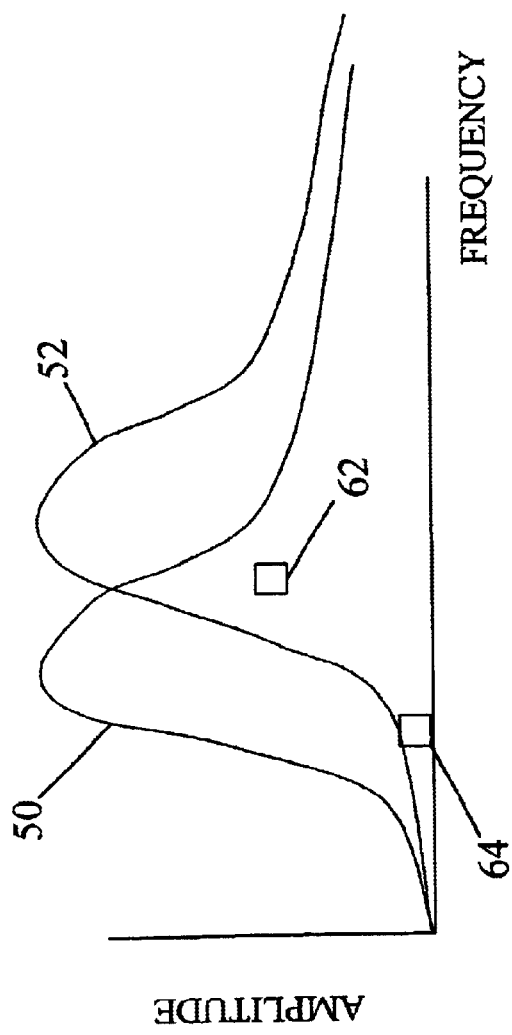
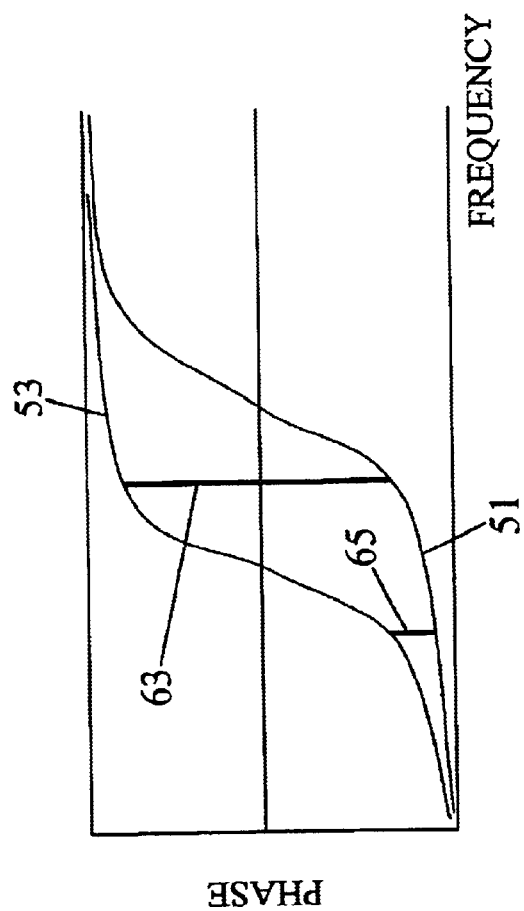
FIG. 5A
FIG. 5B

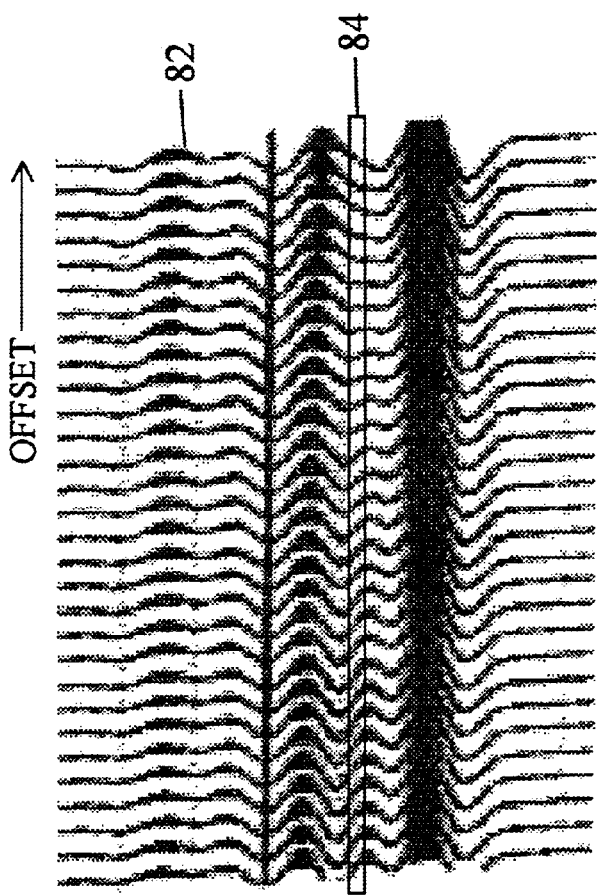
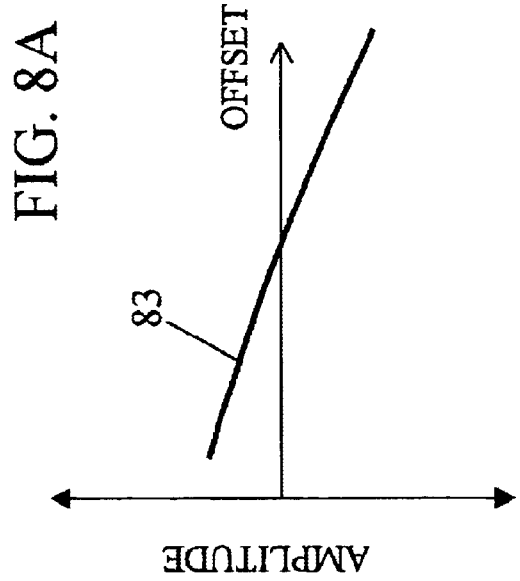

METHOD AND APPARATUS FOR INTERFEROMETRY, SPECTRAL ANALYSIS, AND THREE-DIMENSIONAL HOLOGRAPHIC IMAGING OF HYDROCARBON ACCUMULATIONS AND BURIED OBJECTS

BACKGROUND AND SUMMARY OF THE INVENTION

This invention relates generally to interferometric apparatus and analysis and, more particularly, to the use of such analysis in connection with the detection and exploration of buried objects and hydrocarbons. Interferometric apparatus is also used to estimate elastic properties of associated earth material.

Originally, one type of signal was used to image and analyze earth materials in the subsurface. Seismic, acoustic, electromagnetic, and other types of signals are used for reflection, echolocation, diffraction, and excitation within earth materials. Signals are generated by transducers or other types of sources. Signals generated include discrete or continuous. Discrete signals are a timed event from a source or sources, such as explosive, dynamite, air guns, falling or fired weights, or any general pulse type source that occurs instantaneously, or as a timed event. Continuous signals result from a time-extended source such as a sonic, electromagnetic or radar source. These signals commonly suffer the drawback of containing only a single broadband signal. Likewise, receiver signals contain a single broadband signal. Examples of receiver signals are velocity pickups or electromagnetic transducers used in onshore seismic surveying, hydrophones or piezoelectric transducers used in water covered areas, and antennae used in radar or other electromagnetic surveying. Commonly used arrays consist of one type of transducer or a plurality of the same type of transducer, all having one natural frequency, one natural phase, or a flat amplitude spectrum. Unfortunately, frequency division and isolation used in spectral decomposition and analysis of received signals, as described in U.S. Pat. Nos. 5,414,674 and 6,131,071, are limited. Such signals cannot measure phase velocity. This communication system of source and receiver is used to identify buried earth materials and structures. As described in U.S. Pat. No. 4,316,267, amplitude information collected and processed utilizes an illumination of amplitude with offset (AVO) as the target signature. Amplitude information is normally collected and imaged by generation of broadband signals utilizing receiving devices consisting of one type of transducer or a plurality of the same type of transducer all having one natural frequency or flat spectrum. The target signature or AVO is used to locate gaseous hydrocarbons. Unfortunately, many large and deeper hydrocarbons go undetected.

It is another common industry practice to display images of buried objects using calculated surfaces from observed and received signals from tri-axial sensors. Such sensors are inexact, tedious, and uneconomic to deploy or interconnect, and attempts to measure dispersion and anisotropic characteristics of earth materials have not been reliable.

It would therefore be advantageous to provide, in accordance with the present invention, an apparatus and method for extracting and calculating the general elastic properties of earth materials, surfaces, targets, and hydrocarbons using independently recorded frequency or phase signals. An example of a receiver operating at multiple natural frequencies or natural phases is described in U.S. Pat. No. 5,335,208.

The present invention relates to a method and apparatus for the detection and exploration of buried objects and hydrocarbons employing at least two separate signals combined to form interferometric analysis and imaging of non-optical waves. These imaging systems include seismic, sonar, and radar imaging systems. The technique of measuring and analyzing absorption and other elastic moduli are shown from a three-dimensional analysis of interferometric information. The technique of interferometric holography also uses the unique characteristic record of frequency, phase, and amplitude of more than one signal. This type of analysis facilitates the estimation of elastic properties of earth material.

It is known that holographic visualizations result from image processing of different views of an object or surface commonly projected in three-dimensional space. Different views of the object or surface are normally associated with a measurement of offset. The present invention employs signals of different frequency or different bands of frequencies in imaging processes to generate holographic visualization. Specifically, signals of different frequency or different bands of frequencies may be directly viewed, graphed or projected onto a computer or projection screen to create holographic visualization. Holographic visualizations can be created using information gathered from offset interference measurements to display unique views. Such signals may be used to focus generated energy toward a buried object.

It would be further advantageous to provide, in accordance with the present invention, a method of velocimetry, illumination, and imaging.

It would be further advantageous to provide, in accordance with the present invention, a method for determining an estimate of the elastic parameters or properties of rock as related to the amplitude and phase of interferometric measurements.

It would be further advantageous to provide, in accordance with the present invention, a method of broadband or multiple band illumination using velocity imaging to construct homographic and holographic images of earth materials and buried structures.

It would be further advantageous to provide, in accordance with the present invention, a method of frequency banding or isolation for use in velocity imaging by employing frequency isolation with multiple frequencies.

It would be further advantageous to provide, in accordance with the present invention, a method for detecting subsurface hydrocarbons through the use of phase imaging and interferometric analysis.

It would be further advantageous to provide, in accordance with the present invention, a method for imaging horizontal components or performing shear wave analysis using interferometric analysis.

It would be further advantageous to provide, in accordance with the present invention, a method for imaging near surface structures such as mines, fractures or porosity.

It would be further advantageous to provide, in accordance with the present invention, a method for imaging sound by utilizing homographic analysis.

It would be further advantageous to provide, in accordance with the present invention, a method for determining range and depth of targets using selected frequency and phase information.

It would be further advantageous to provide, in accordance with the present invention, a method for producing a holographic image.

It would be further advantageous to provide, in accordance with the present invention, a method of analysis for diagnosing spectral absorption.

It would be further advantageous to provide, in accordance with the present invention, a frequency or phase modulated source of energy in the radar spectrum to detect hidden or buried objects.

BRIEF DESCRIPTION OF THE DRAWINGS

FIG. 3A is a depiction, perpendicular to the axis of propagation, of the waveform of FIG. 2A at a particular point in time.

FIG. 3B is a depiction, perpendicular to the axis of propagation, of the waveform of FIG. 2B at a particular point in time.

FIG. 3C is a depiction, perpendicular to the axis of propagation, illustrating an interference pattern signal resulting from the combination of signals of FIGS. 3A and 3B.

FIG. 4A is a representation of a three-dimensional graphical representation of cell or points containing signal information used for signal analysis.

FIG. 4B is an enlarged view of one of the cells and vector type designations of FIG. 4A.

FIG. 4C is a three-dimensional representation of a portion of a stress-strain ellipsoid or other elastic moduli ellipsoid resulting from the rotation of an original orthogonal coordinate system deduced from the information contained in the cells of FIGS. 4A and 4B.

FIG. 5A is a spectrum plot of multiple signals illustrating amplitude versus frequency characteristics containing more than one selected frequency or more than one band of frequencies signals from electromagnetic transducers.

FIG. 5B is a spectrum plot illustrating phase versus frequency of the multiple signals of FIG. 5A.

FIG. 8A is a graphical representation of the amplitude of the reflection versus offset or some angle of incidence of a deeper hydrocarbon-bearing zone.

FIG. 8B is a waveform diagram over some sample of time of the signal associated with the graphical representation of FIG. 8A.

DETAILED DESCRIPTION OF THE PREFERRED EMBODIMENTS

Figure 1A:
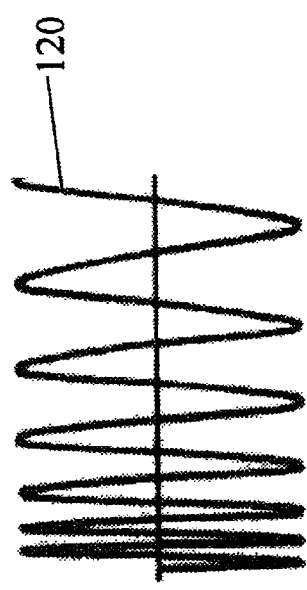
FIG. 1A is a waveform diagram of a source frequency or phase modulated signal that is employed in the apparatus and method of the present invention.
Figure 1B:
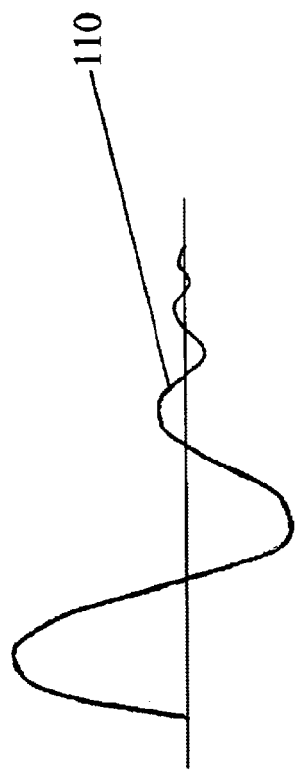
FIG. 1B is a waveform diagram of an amplitude and frequency-varying signal employed in the apparatus and method of the present invention.
Figure 1C:
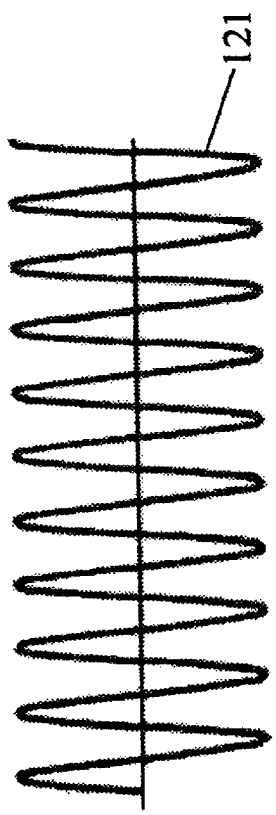
FIG. 1C is a waveform diagram of a signal on one frequency employed in the apparatus and method of the present invention.
Figure 11:
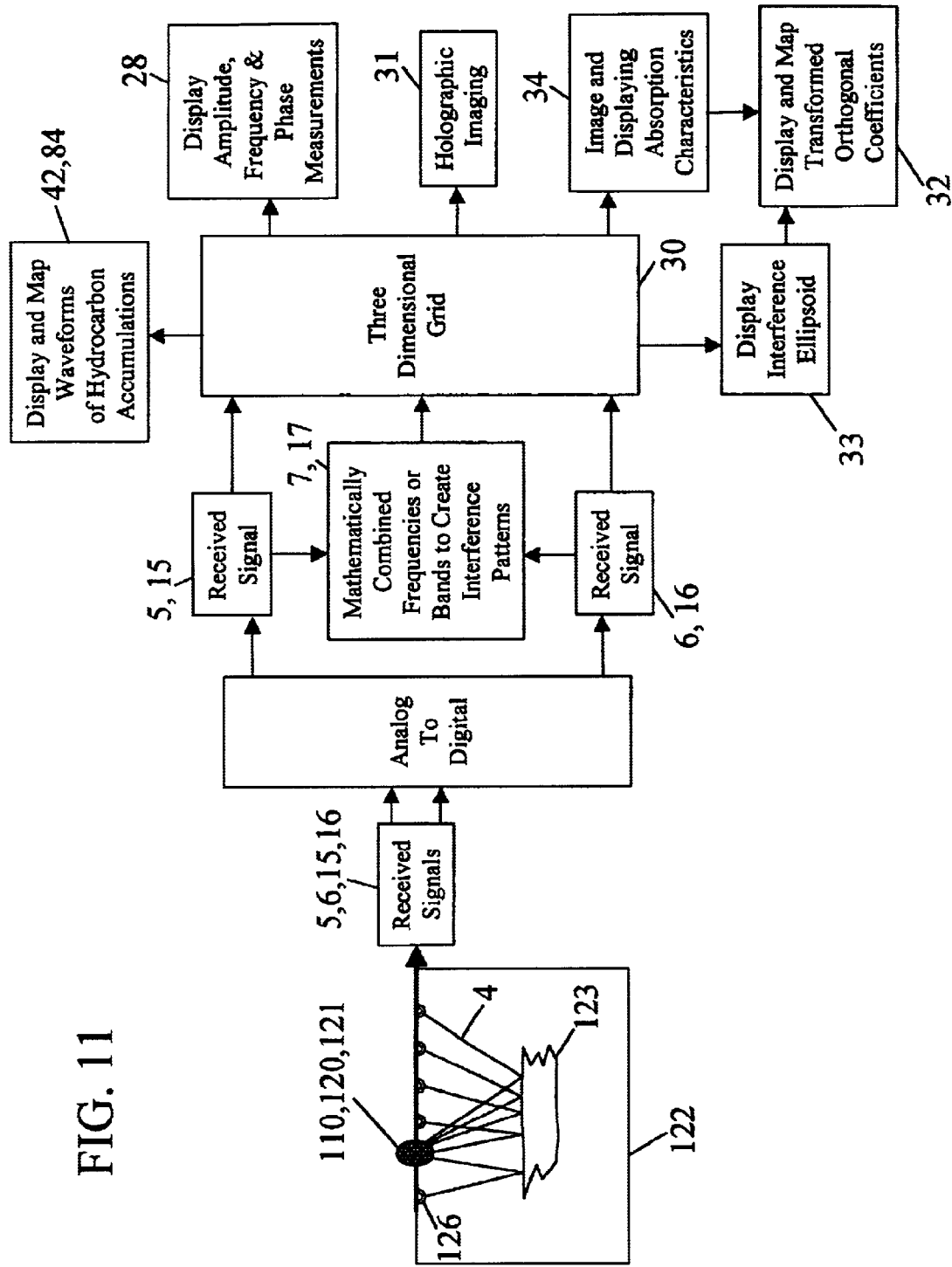
FIG. 11 is a flow chart representation of the interferometric seismic date processing used to image, display, and map subsurface objects and hydrocarbon accumulators.

Referring to FIGS. 1A–B and 11, signals that contain more than one frequency or wavelength are commonly used in subsea and/or subsurface surveying for the detection of buried objects including hydrocarbon accumulations. Excitation or activation of a source provides a signal that results in propagation through an earth medium 122 such as soil, rock, sea bottom, and water. The source signals may be broadband, containing more than one frequency or wavelength, or containing more than one band of frequencies or wavelengths, or they may be multiband signals. These broadband or multiple band signals may be discrete signals 110, such as explosive, weight drop or sonar pulses, whose coherence is measured by a specific time of excitation and propagation and that generally contain a band or range of frequencies. Other forms of coherent broadband or multiple band source signals are modulated signals. Examples of modulated signals include frequency or phase modulated source signals 120. A broadband signal 121, as illustrated in FIG. 1C, is a single frequency signal. Such single frequency signals are typically used for target illumination or detection of buried objects including hydrocarbons, and they may represent radar, acoustical, sonic, seismological, and electromagnetic (magnetometer) sources.

Such signals propagate through the earth, and information concerning the presence of targets is contained in the observed or received signals 5, 6, 15, 16, as illustrated in FIGS. 2A, 2B, 3A, and 3B. Each frequency may be considered a channel or band. Received signals 5, 6, 15, 16 have undergone transmission from a source, reflection at a target, and transmission from the target. Receivers 126 that observe and measure more than one frequency or bands of frequencies containing phase and amplitude information at a specific location in time and space are described in U.S. Pat. Nos. 5,335,208 and 5,231,252. The present invention utilizes signal analysis and the phenomena of dispersion and absorption of different bands in predictive and decision processes leading to detection of hydrocarbon accumulations 123 and detonation of buried objects.

Figure 2A:
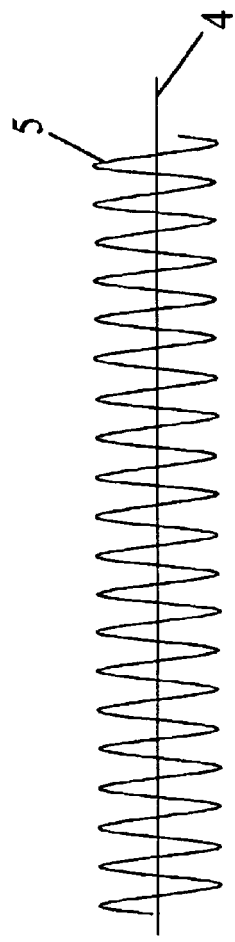
FIG. 2A is a waveform diagram illustrating the propagation of a single frequency signal or a limited band of frequencies signal.
Figure 2B:
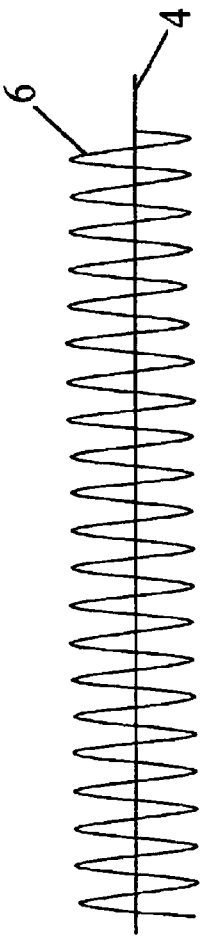
FIG. 2B is a waveform diagram illustrating the propagation of a single frequency signal or a single band of frequencies signal that differs from the signal of FIG. 2A.
Figure 2C:
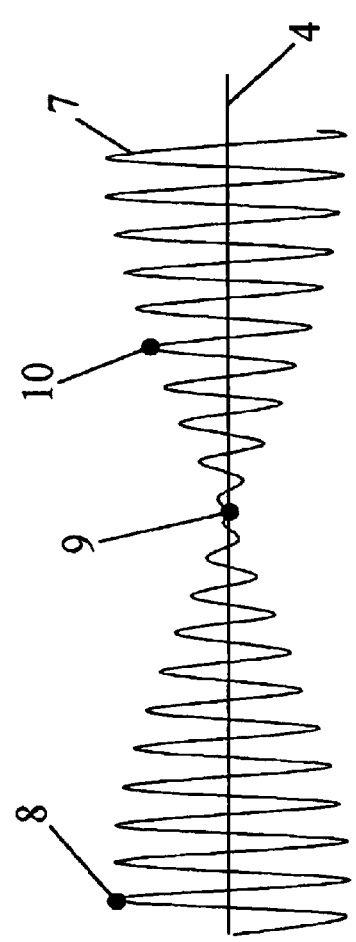
FIG. 2C is a waveform diagram illustrating an interference pattern signal resulting from the combination of the signals of FIGS. 2A and 2B.

Referring now to FIGS. 2A–C and 11, a signal 5 of selected frequency, or limited band of frequencies, containing phase and amplitude information sampled in time (t) along some line or path of propagation 4, is combined with a separate and different signal 6 of a different selected frequency, or limited different bands of frequencies, containing different phase and amplitude information, and sampled in time along a common line or radii of propagation 4 to form an interference pattern 7 illustrated in FIG. 2C. The interference pattern 7 is created by superposition in analog or digital form of received signals 5, 6, 15, 16 from a common source signal. In digital form or after analog is converted to digital form and can be referenced by a vector containing parameters a, b, t at some point of superposition of two or more signals in time or along a line or path of propagation (t). Points of reference refer to receiver and source locations which contain the spatial component a and b, direction and distance, respectively. Time, t, represents the travel time of signal between receiver and source locations commonly sampled well below Nyquest frequency and may be thought of as a path of propagation 4 measured in time. In the case of reflection and wave conversion, path of propagation refers to incident and reflected or converted path segments. Maximum point 8, minimum point 9, and arbitrary point 10 represent points on the resultant signal resulting from the superposition of waves that when combined create constructive, destructive, and another measure of interference, respectively. Minimum point 9 has a measure of amplitude or intensity of interference, and the two signals are 180 degrees out of phase. Maximum point 8 shows a measure of amplitude interference and a phase measure of zero, where both signals are in phase. Maximum point 8 indicates maximum strain, and minimum point 9 indicates minimum strain. All points along path of propagation 4 have a specific and related phase measurement, linear for single frequencies and nonlinear for bands of frequencies. Points 8 and 9, as well as all points along the time axis between excitation and reception are referenced by spatial locations a, b, and t. Point 9 shows the least amplitude or intensity between the signals and therefore determines the phase to be reversed or 180 degrees. Point 8 shows the greatest amplitude or intensity between the signals and therefore determines the phase to be zero degrees. Points 8 and 9 are created simply by adding, or any other mathematical formula, including analog or digital, the relative amplitudes together. One example of the type of mathematical formula might be cross correlation, where a value of interference is a measure of cross correlation between signals 5 and 6. Interference pattern 7 may be analyzed using a Fourier series in order to quantify the patterns of amplitude and phase over some sampling period or collection of sampling periods. These same signals 5, 6, 7 are now depicted in a different dimension in FIGS. 3A–C.

Referring now to FIGS. 3A–C, in a separate associated dimension that is usually orthogonal or near orthogonal, signal 15 of selected frequency, or limited band of frequencies, containing phase and amplitude information sampled spatially in the a, b, and t directions along a similar plane or surface of interest, is combined with a separate and different signal 16 of different selected frequency, or different bands of frequencies, containing different phase and amplitude information sampled along a common plane or surface of interest 14 to form a resultant orthogonal interference pattern 17. The orthogonal interference pattern 17 is created by superposition in analog or digital form of received signals from a common source signal 110, 120, 121. In digital form or after analog is converted to digital form and referencing by the spatial location containing a, b, and t coordinates of receiver, source, and the selected point of combination of two signals. The plane or surface is at some defined angle orthogonal or near orthogonal to the line or path of propagation 4. Similarly, an interference pattern 7 of FIG. 2C is at some defined angle to orthogonal interference pattern 17. Point 19 represents the superposition of waves that, when combined, create interference and is the same as a single point along path of propagation 4 in FIG. 2C. Arbitrary point 18 also results from the superposition of waveforms. A measure of interference exists at arbitrary point 18, as well as at all points along orthogonal interference pattern 17. Orthogonal interference pattern 17 may be analyzed using a Fourier series in order to quantify the patterns of amplitude and phase over some sample time or collection of time samples. FIGS. 2C and 3C illustrate in two-dimensional and orthogonal views the basis of developing a three-dimensional interference pattern used for interferometric signal analysis. Three-dimensional interference patterns can be constructed with a plurality of source and receiver stations commonly used in three-dimensional seismic or subsurface surveying where many source or excitation stations transmit via direct, reflection, and defraction to many receiver stations throughout the area. Data sets collected in such a fashion are commonly gridded into bins or cells as in a cube or other volume. FIG. 4A, as well as FIG. 11, shows a three-dimensional grid 30 constructed of cells, where each cell contains measurements 28 or samples of signals from more than one individual frequency or limited bands of frequencies having a spatial coordinate (a, b, and t), within a selected coordinate system 21. Cells may be represented by a collection of points or samples. In the case of the three-dimensional interference pattern, the cells of three-dimensional grid 30 also contain some measure of signal interference for each cell.

Referring to FIG. 4B, cell 22 contains samples over some selected period of time of at least one pair of signals representing a plurality of individual frequencies or plurality of limited bands of frequencies. Cell 22, and many others, contain at least amplitude and frequency information for at least one pair and also may contain a measure of interference between the pair. Therefore, each cell can now have at least two samples containing measures of relative amplitude or intensity plus a sample of interferometric measurement 28 containing amplitude or intensity and phase as shown in FIGS. 2A–C and 3A–C. Samples containing amplitude or intensity information of at least one pair of signals may be used to determine information about reflections and echoes. Samples in cell 22 are stored in a computer for analysis and subsequent imaging. A survey of the subsurface commonly contains a collection of sources and receivers distributed at an earth material surface, or within said material, with multiplicity or fold. Such a survey may take place in a borehole for analysis and imaging of adjacent earth formation.

Referring to FIGS. 4A–B, there is shown an orthogonal coordinate system 21 selected for signal processing of three-dimensional grids. Examples of a spatially referenced three-dimensional grid 30 that may be selected for analysis include source, receiver, common mid point (CMP), common reflection point (CRP) or any other zone of interest between source and receiver. The axes a and b represent dimensional geographic or spatial coordinates containing direction and distance variables. Distance between the cell and the center of selected grid reference is represented as a vector 29, containing some measure of offset. Offset commonly refers to the distance between a source and a receiver. The vertical axis is measured or sampled in time, t. Offset and time are commonly used to determine velocity (velocity=offset/time) for transmission, reflection, and refraction of signals. Interference patterns result within a selected reference grid. Interference is constructed between smples of at least two signals of different frequency or different bands of frequencies for each cell. One type of interference pattern 7, 17 is constructed when a selected signal at the center of selected reference grid 28, called a reference frequency signal, is combined with a second interfering signal of different frequency or different bands of frequencies in other samples or cells with different offsets. Offsets containing interference maximums and minimums of amplitude or intensity with spatially varying time then define or estimate a phase velocity. It is clear that the above analysis now shows a unique technique for determining interference patterns and velocities, both amplitude and phase velocities, for transmitted, reflected, and refracted using the individual frequencies or limited bands of frequency signals. These velocities may be used in subsurface holographic imaging, as represented by block 31 in the flow chart of FIG. 11.

In the case of CMP or CRP, it is intended in the present invention to use the amplitude information within cells throughout grid 30 to determine alternate orthogonal directions that relate to elastic moduli 32 of the reflecting and refracting subsurface. An incident wave or signal at a subsurface interface yields a reflection and a refraction. The amount of reflection and refraction depends on the nature of the elastic properties of the subsurface material generating the reflection and refraction. Elastic properties are described by a general elasticity tensor relating stress and strain. The tensor specifically relates the stress ellipsoid to the orthogonal strain ellipsoid. Certain hydrocarbon accumulations 123 and subsurface materials display a certain variation of P-wave velocity to S-wave velocity as a function of offset, generally described by the material's Poisson ratio, an elastic moduli 32. Interferometric analysis of amplitude or intensity not only shows the amplitude information but also describes phase velocity as a three-dimensional spectral tensor. FIG. 4C shows a vector rotation of orthogonal coordinate system 21 resulting from analysis of cells within a CMP or CRP three-dimensional referenced grid into an orthogonal position 24 related to interferometric values or values created from more than one single frequency signal or limited band of frequencies. Vectors represented by points 25, 26, 27 of FIG. 4C depict an interference ellipsoid 33 showing a maximum and a minimum in three-dimensional tensor space.

Such tensors have eigenvalues that may be used for determining eigenfunctions or individual characteristics of wave superposition for events such as transmission, reflection, diffraction, and conversion.

One application of the present invention is the development of interferometric spectral and absorption analysis. Cell 22 of FIG. 4B may be analyzed as a spectral cell. FIG. 5A is a spectral graph of amplitude versus frequency for received earth-penetrating signals. Amplitude spectral band curves 50 and 52 represent separate received signals of different selected limited frequency bands. Curves 51 and 53 are corresponding phase spectral band curves. More than two bands may be used. Curves 50 and 52 may represent signals from electromagnetic transducers that are slightly dampened or naturally dampened. Critically dampened transducers of one natural frequency are commonly used and later spectrally decomposed as described in U.S. Pat. No. 6,131,071 to Partyka and U.S. Pat. No. 5,414,674 to Lichman. Cell 62 of FIG. 5A contains vector information for two samples or collections of samples from signals associated with curves 50 and 52. Corresponding phase is shown in FIG. 5B. Cell 62 has a corresponding phase measurement lying somewhere along range 63 between the signals. Range 63 shows types of phase differences that may exist, depending on the type of reflection or absorption. Absorption is the measure of amplitude or intensity converted into heat or strain energy as a function wavelengths (frequencies) and resonance within a material. Cell 62 shows a relatively low degree of absorption due to the large phase differences that may exist within the material interval or zone represented by cell 62. Materials that display a high degree of phase difference between frequency means that the received signals pass through the material with minimum strain or heat and thus have low absorption, as illustrated by point 9 of FIG. 2C. Materials represented by cell 64, on the other hand, display higher degrees of resonance where frequencies are in phase, as represented by range 65 of FIG. 5B, causing and effecting more energy transfer into other forms of energy, such as strain and heat. Consequently, material represented by cell 64 is highly absorptive. By performing this analysis of interference over a spatially referenced three-dimensional grid, one can determine the principal planes of minimum absorption, maximum absorption, and a third orthogonal direction absorption value. The mapping and imaging of the relative changes between many cells of different offsets result in the estimate of the absorption ellipsoid 34 for reflecting and refracting earth materials, as illustrated in FIG. 11. Earth materials, such as hydrocarbon filled fractures or other earth anisotropy, commonly exhibit directional variation of absorption and associated mode conversion that may be described by an absorption ellipsoid 34. Absorption for a particular sample or collections of samples within a spatially referenced coordinate system is analyzed or determined by interferometric analysis and rotating principal absorption axes similar to the process illustrated in FIG. 4C.

Figure 6A:
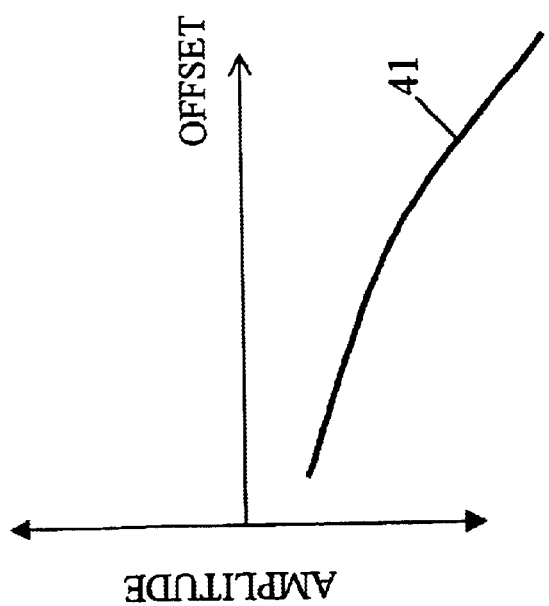
FIG. 6A is a graphical representation of the amplitude of the reflection versus offset or some angle of incidence of a hydrocarbon-bearing zone for a CMP or CDP reference grid.
Figure 6B:
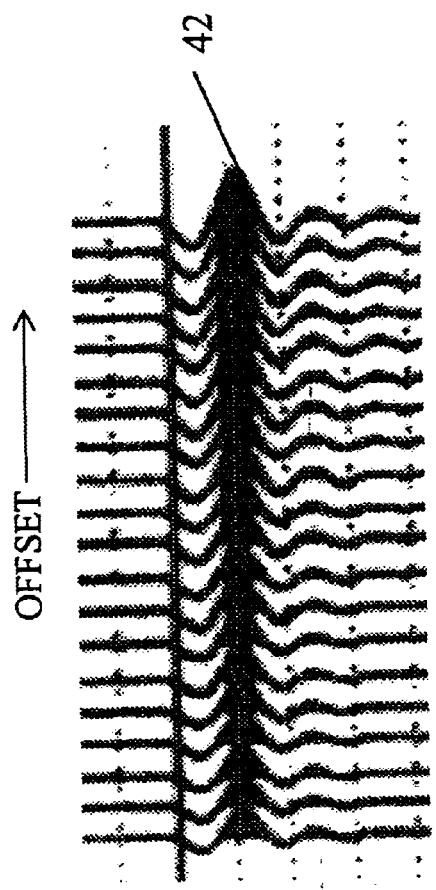
FIG. 6B is a waveform diagram over some sample of time of the signal associated with the graphical representation of FIG. 6A.

U.S. Pat. No. 4,316,267 to Ostrander describes the measurement of amplitude within a CMP or CRP grid and relating those measurements to an estimated Poisson ratio. FIGS. 6A–B are an illustration showing the type of amplitude vs. offset (AVO) analysis commonly used for the diagnosis of gaseous hydrocarbon accumulations. FIG. 6A is a graphic view of an amplitude versus offset curve 41 associated with a gaseous hydrocarbon-bearing zone. Curve 41 shows how amplitude increases with offset within a CMP or CRP. FIG. 6B is the corresponding waveform diagram 42 that is commonly corrected with a calculated and normally a hyperbolic velocity field called normal moveout within the CMP or CRP. Waveform diagram 42 consists of some 20 waveforms, each with different amounts of offsets, the waveforms becoming larger in amplitude with larger offset values. Ostrander shows how this AVO effect of a gaseous hydrocarbon-bearing interval is related to this interval having a low Poisson ratio. This method of AVO analysis has resulted in the direct detection of gaseous hydrocarbons, thereby reducing significant economic risk for hydrocarbon producers. This type of analysis facilitates locating, drilling for, and producing valuable hydrocarbon accumulations 123 and resulted from the use of one type of detector or receiver containing one band of frequencies.

Figure 7A:
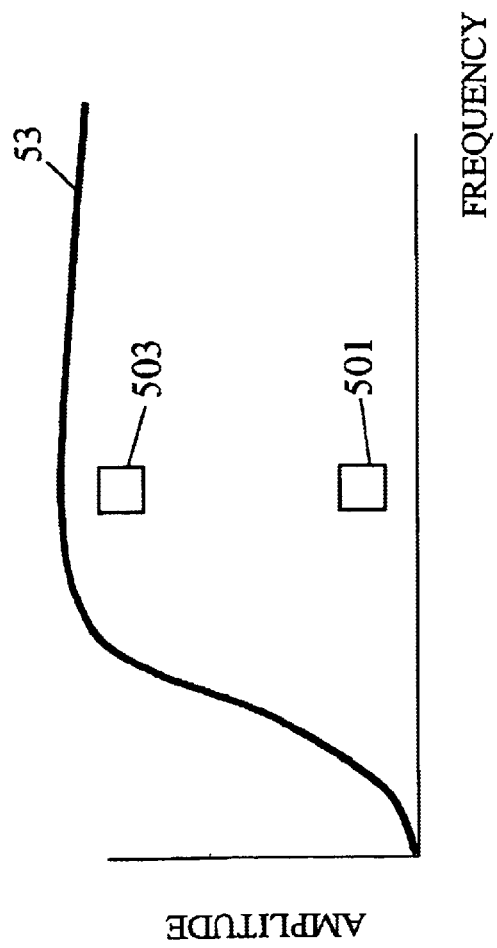
FIG. 7A is a spectrum plot illustrating amplitude versus frequency of near offset signals returned from a hydrocarbon-bearing zone.
Figure 7B:
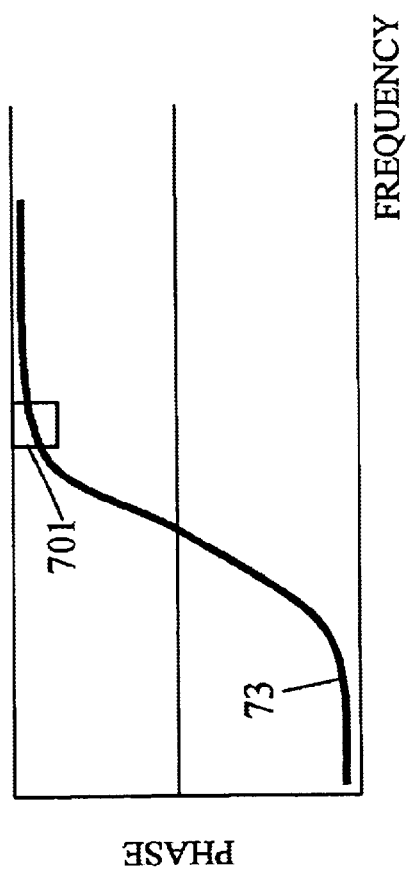
FIG. 7B is a spectrum plot illustrating amplitude versus frequency of far-offset signals returned from a hydrocarbon-bearing zone.

FIGS. 7A–B show the spectral curves and analysis used in AVO type of signal analysis to locate hydrocarbons. FIG. 7A shows an amplitude spectrum curve 53 of a particular type of signal output that results from the use of a common single natural, critically dampened receiver. FIG. 7B shows the corresponding phase spectral curve 73 for signals lying within the spectrum curve 53. These types of signals and corresponding receivers are employed in signal detection and analysis, as described in U.S. Pat. Nos. 5,414,674, 4,316,267, and 6,131,071. Cell 501 represents a CMP or CRP-referenced grid containing a signal having a small amplitude associated with a small offset. Cell 503 represents the same CMP or CRP-referenced grid containing a signal having a larger amplitude associated with a larger offset.

Each cell contains a single measurement. Cell 701 roughly depicts the type of phase information associated with the measurement of signals in cells 501 and 503. This spectral analysis is for the waveforms and graphs of FIGS. 6A–B, depicting gaseous hydrocarbons. These types of hydrocarbon accumulations 123 displaying AVO have been found with a high degree of success by hydrocarbon producers.

FIGS. 8A–C are an illustration showing the type of amplitude vs. offset (AVO) analysis commonly attempted to diagnosis deeper and harder to find gaseous hydrocarbon accumulations. FIG. 8A shows an amplitude versus offset curve 83 for such a gas-bearing event, illustrating how amplitude changes with offset. Over the first one-half of the offset range, amplitude decreases, and over the second one-half of the offset range, the amplitude increases. FIG. 8B shows the corresponding waveform 84 of a gas bearing interval. The waveform 82 is commonly corrected with a single hyperbolic velocity field called normal moveout within the CMP or CRP. Waveform 82 consists of some thirty waveforms, each with different amounts of offset, illustrating the relatively low and contradictory amplitude response with offset. This type of subtle and amplitude reversal has made these type of hydrocarbon accumulations hard to find, especially at large depths. In accordance with the present invention, economic risk may be reduced by analyzing, mapping, and imaging of interferometric signals to locate, drill, and produce hydrocarbon accumulations that display a certain characteristic seismic signature.

Figure 9A:
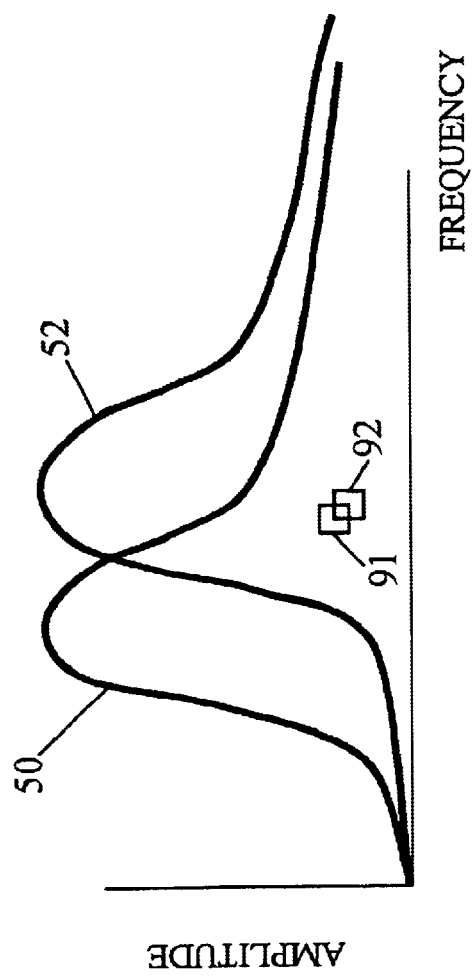
FIG. 9A is a spectrum plot of multiple signals illustrating amplitude versus frequency characteristics.
Figure 9B:
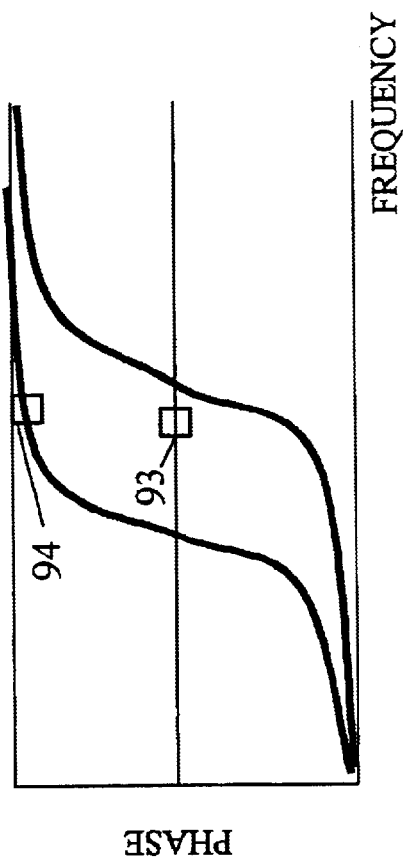
FIG. 9B is a spectrum plot illustrating phase versus frequency of the multiple signal of FIG. 9A.

FIGS. 9A–B illustrate spectral curves for two signals. Cell 91 represents a cell containing a maximum phase difference 93 from interference analysis and low amplitude for the desired near offset response. Cell 92 illustrates the far offset response and represents another low amplitude and a phase reversal 94. A resulting tensor analysis looks for this type of signature in a volume of three-dimensional seismic to detect, image, map and drill these phase vs. offset (PVO) anomalies 84. Another tensor analysis may take place within a borehole to detect gaseous hydrocarbons in adjacent earth formations.

A unique characteristic of holography is its ability to record both the phase and amplitude of a non-optical earth-penetrating source signal at more than one frequency. Holographic interference fringes can be created using phase-measurement between frequency signals as described.

Other types of single frequency or band-limited frequencies sampled with piezoelectric transducers, as used in offshore seismic surveying, or radar, commonly used in near subsurface surveying, may be additionally used in the analysis, either separately or in combination.

Figure 10:
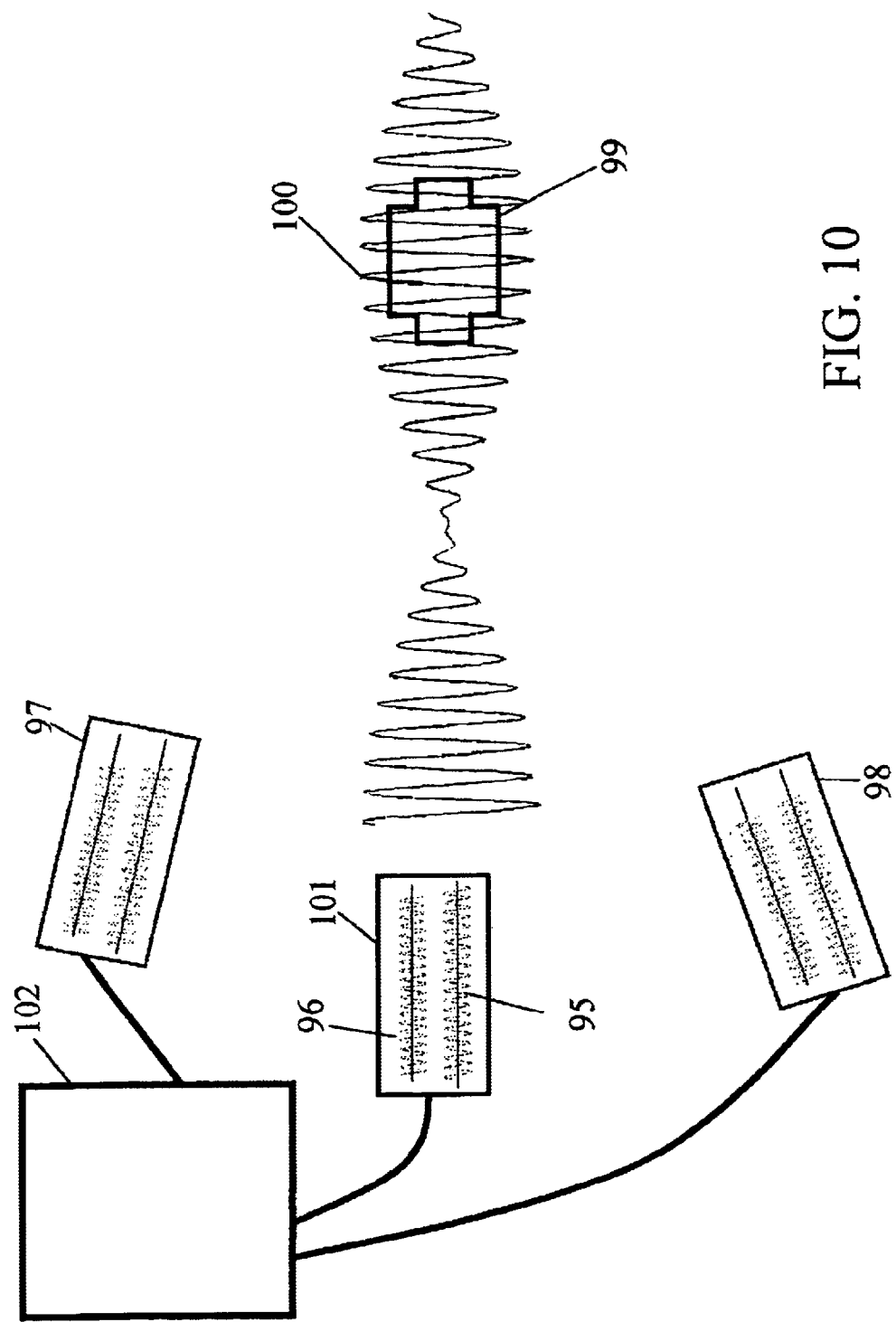
FIG. 10 is a representation of the apparatus and method used to map and image subsurface objects, surfaces, composition and structure of earth material and employed in the mine excitation process.

FIG. 10 shows an apparatus and method used to create and receive the same type of interference patterns described above that can be employed to detect the composition and structure of the subsurface, including the detection and detonation of buried land mines. Since land mines commonly consist of metal, the electromagnetic spectrum produced by them is ideal for detection, especially using interferometric electromagnetic signals. A device consisting of magnetometers can detect at some distance. In soft earth material, such as soil or sand, land mines, being dense objects, provide a density contrast for possible detection with previously described interferometric acoustic techniques. In the event land mines are detected, interference signals may be generated at those locations. Interference signals or waveforms are created by signals 95 and 96 of FIG. 10, both of different frequencies or bands of frequencies, that are excited from a common location transducer module 101. Other locations of transducer modules 97, 98 may be used. The transducer modules 101, 97, 98 may be positioned within a borehole, which may contain casing and bonding materials between transducer modules and earth materials. Borehole locations can contain transducer modules capable of creating, as well as receiving, signals 95 and 96. A computer 102 is employed to store, process, and map the approximate location of remote land mine 99 or other subsurface features or surfaces. One type of process is to calculate the location for sources and an area where maximum strain energy or signals of maximum resonance 100 is needed in order to create a signal that will critically excite land mine 99. Resonance signal 100 is a graphic representation depicting the relationship of maximum strain created at a selected location to the center location of mine 99. Interference of signals is created for the purpose of excitation or illumination of targets.

I claim:

1. A method of seismic surveying for the detection of buried objects and hydrocarbon accumulations, the method comprising:

obtaining a plurality of analog earth propagating seismic signals, each of which has an associated different frequency characteristic resulting from a selected one or both of a receiver station and an excitation station, each of said earth propagating seismic signals being sampled over a period of time;

converting said plurality earth propagating seismic signals to digital form;

creating a selected reference grid of cells, each cell containing at least three samples consisting of at least two measurements in digital form of earth propagating seismic signals and at least one combination in digital form of the plurality of earth propagating seismic signals, each cell representing an interference measurement; and displaying said selected reference grid containing a plurality of interference measurements.

2. A method as in claim 1, wherein the earth propagating seismic information comprises a plurality of signals from a plurality of receiver stations sensed from a plurality of excitation stations.

3. A method as in claim 1, wherein said received information comprises a first band frequency characteristic signal and a second band frequency characteristic signal.

4. A method as in claim 1, wherein the first frequency characteristic signal and a second frequency characteristic signal are separately and simultaneously received.

5. A method as in claim 1, wherein the first frequency characteristic signal and the second frequency characterisitc signal result from the use of at least two transducers having different piezoelectric characteristics.

6. A method as in claim 1, wherein the first frequency characteristic signal and the second frequency characteristic signal result from the use of at least two transducers having different electromagnetic characteristics.

7. A method as in claim 1, wherein the first frequency characteristic signal and the second frequency characteristic signal result from the use of at least two different transducers, each having a selected one or both different frequency characteristic and different phase characteristic.

8. A method as in claim 1, wherein said earth propagating seismic information comprise at least two simultaneous signals propagating through earth materials, each having a different frequency characteristic resulting from the use of at least one directionally-oriented transducer.

9. A method as in claim 1, wherein the first frequency characteristic signal and second frequency characteristic signal are the same frequency each having one or both of a different phase characteristic and a different amplitude characteristic.

10. The method according to claim 1, wherein the interferometric signal is created by a mathematical process using at least the first frequency characteristic signal and the second frequency characteristic signal.

11. The method according to claim, wherein the interferometric signal is in analog form created by an electrical combining process using at least a first frequency characteristic transducer and a second frequency characteristic transducer further converting interferometric signal to digital form.

12. A method as in claim 1, further comprises converting one of interferometric signal and interferometric samples into at least one of both a interferometric measurements and phase measurements.

13. A method as in claim 12, wherein the step creating a selected more than one dimensional grid of cells comprises creating one or both a map and an image of phase measurements.

14. A method as in claim 1, wherein more than one dimensional grid comprises of one or both spatial dimensions and time dimension.

15. A method as in claim 1, wherein the grid comprises a grid referenced to a selected one or more of common mid points, common reflection points, excitation points or receiver point.

16. A method as in claim 1, wherein the step of creating a selected more than one dimensional grid of cells, each cell comprises phase, frequency and amplitude samples.

17. A method as in claim 1, selecting samples to show patterns used to identify earth material composition, earth structure, or buried object is performed with a computer.

18. The method as is in claim 1, wherein using at least the interferometric signal to detect and analyze directly transmitted earth propagating seismic information.

19. The method as is in claim 1, wherein using at least the interferometric signal is used to detect and analyze reflected earth propagating seismic information.

20. The method as is in claim 1, wherein using at least the interferometric signal is used to detect and analyze diffracted earth propagating information.

21. A method as in claim 1, wherein the step of using at least the interferometric signal includes displaying one or both of map view and cross sectional view.

22. A method as in claim 1, wherein at least the interferometric signal is used to create a holographic image of one or more of earth material composition, earth structure, or buried object 23. A method as in claim 1, wherein at least the interferometric signal is used to determine elastic properties of one or more earth material composition, earth structure, or buried object.

24. A method as in claim 1, wherein at least the interferometric signal is used to analyze one or both earth material and earth material containing hydrocarbons adjacent to a borehole.

25. A method of seismic surveying for locating a hydrocarbon accumulation, the method comprising:
obtaining a group of received earth propagating seismic information in digital form, said information obtained from at least one receiver station sensing one or more excitation stations, the received information comprising a first frequency characteristic signal, a second frequency characteristic signal and interferometric signal, said interferometric signal comprising a combination of the first frequency characteristic signal and the second frequency characteristic signal;
selecting a more than one dimensional grid of cells, each cell comprising at least a sample of said interferometric signal;
converting said samples into at least phase measurements; and
using at least the measurements to identify phase versus offset anomalies.

26. A method as in claim 25, wherein the earth propagating seismic information comprises a plurality of signals from a plurality of receiver stations sensed from a plurality of excitation stations.

27. A method as in claim 25, wherein grid comprises a collection of bins.

28. A method as in claim 25, wherein grid is a selected three-dimensional orthogonal grid comprising spatial and time coordinates.

29. A method as in claim 25, wherein the grid comprises a grid referenced to a selected one or more of common mid points, common reflection points, excitation points or receiver point.

30. A method as in claim 25, wherein each cell of more than one dimensional grid comprises samples of phase, frequency and amplitude.

31. A method as in claim 25, further comprises creating a map view of at least phase versus offset measurements.

32. A method as in claim 25, further comprises creating cross section view of at least phase versus offset measurements.

33. A method as in claim 25, wherein step of using at least the measurements further comprises calculating one or more phase velocities.

34. A method as in claim 25, further comprises transforming a three-dimensional reference grid to obtain a plurality of transformed orthogonal coefficients indicative of a direction and amount of phase maximum and minimum.

35. A method of seismic surveying for performing elastic properties analysis of earth materials and buried objects comprising:
obtaining a group of received earth propagating seismic information in digital form over a selected volume of earth obtained from at least one or more excitation stations, said information comprising at least a first frequency characteristic signal and a second frequency characteristic signal;
comprising the first and second frequency characteristic signals to create an interferometric signal;
creating a selected a more than one dimensional grid of cells, each cell comprising at least a sample of said interferometric signal;
converting samples of said interferometric signal into at least one of interferometric measurements or phase measurements;
analyzing the measurements to determine principle vector information, comprising at least maximum and minimum vector information; and
using at least vector information to determine elastic properties of one or more earth material composition, earth structure, or 36. A method as in claim 35, wherein the earth propagating information comprises a plurality of signals sensed at a plurality of receiver stations transmitted from a plurality of excitation stations.

37. A method as in claim 36, wherein analyzing the measurements to determine principle vector information comprises a mathematical transformation process to determine orthogonal coefficients.

38. A method as in claim 36, wherein vector information is used to determine absorption characteristics of one or more of earth material composition, earth structure, or 39. A method as in claim 36, wherein vector information is used to determine elastic moduli of one or more of earth material composition, earth structure, or buried object.

40. A method as in claim 36, wherein the first frequency characteristic signal and the second frequency characteristic signal result from the use of at least two different transducers, each having a selected one or both frequency and phase characteristics.

41. A method as in claim 40, wherein different transducers comprise each transducer having a different one or both frequency and phase characteristics.

42. A method according to claim 35, wherein the one or both interferometric measurements and phase measurements are created by a selected mathematical process using at least the first and second frequency characteristic signals.

43. A method as in claim 35, wherein measurements comprises a plurality of eigenvalues of a selected one or both amplitude and phase values.

44. The method as is in claim 35, wherein using vector information comprises identifying comprises identifying elastic properties of at least one of directly transmitted earth propagating seismic information, reflected earth propagating seismic information, and diffracted earth propagating seismic information.

45. A method as in claim 35, wherein a selected one or both of frequency characteristic signal and band of frequencies characteristic signal as a reference for comparing the signals.

46. A method as in claim 1, wherein step of selecting samples comprises calculating one or more phase velocities.

47. A method as in claim 1, wherein pattern further comprises transforming a three-dimensional reference grid to obtain a plurality of transformed orthogonal coefficients indicative of a direction and amount of at least interference samples.

48. A method as in claim 1, wherein step of creating grid is performed before combining the first and second frequency characteristic signals to create an interference signal.

49. A method as in claim 1, wherein the step of selecting samples comprises analyzing samples to determine and show principle vector information.

50. A method as in claim 49, wherein vector information is used to determine elastic properties of earth material composition, earth structure, or buried object.

51. A method as in claim 25, wherein step of selecting a more than one dimensional grid of cells, each cell further comprising samples of one or both amplitude and frequency.

52. A method as in claim 25, wherein at least the interferometric signal is used to analyze one or both earth material and earth material containing hydrocarbons adjacent to a borehole.

53. A method as in claim 35, wherein using at least vector information to determine elastic properties of one or both earth material composition and earth material containing hydrocarbons adjacent to a borehole.

* * * * *